US008245667B2

(12) United States Patent
Mateer et al.

(10) Patent No.: US 8,245,667 B2
(45) Date of Patent: Aug. 21, 2012

(54) HUMMINGBIRD FEEDER WITH DISPOSABLE RESERVOIR AND REUSABLE BASE

(75) Inventors: Chad Mateer, Manheim, PA (US); Christopher J. Kamery, Lancaster, PA (US); Marko Lubic, Shillington, PA (US)

(73) Assignee: Woodstream Corporation, Lititz, PA (US)

( * ) Notice: Subject to any disclaimer, the term of this patent is extended or adjusted under 35 U.S.C. 154(b) by 300 days.

(21) Appl. No.: 12/385,396

(22) Filed: Apr. 7, 2009

(65) Prior Publication Data

US 2010/0251967 A1 Oct. 7, 2010

(51) Int. Cl.
*A01K 7/00* (2006.01)
(52) U.S. Cl. ........................................................ 119/77
(58) Field of Classification Search ............... 119/77; 222/437, 457, 585, 650; 141/1, 326
See application file for complete search history.

(56) References Cited

U.S. PATENT DOCUMENTS

| 3,364,930 | A | * | 1/1968 | Ryan | 604/244 |
| 4,173,858 | A | * | 11/1979 | Cassia | 53/471 |
| 4,846,236 | A | * | 7/1989 | Deruntz | 141/329 |
| 4,939,800 | A | * | 7/1990 | Fiorentino et al. | 4/620 |
| 4,991,635 | A | * | 2/1991 | Ulm | 141/346 |
| 5,105,858 | A | * | 4/1992 | Levinson | 141/2 |
| 5,967,197 | A | * | 10/1999 | Shown | 141/18 |
| 7,331,487 | B2 | * | 2/2008 | Macler et al. | 222/83 |
| 7,481,023 | B1 | * | 1/2009 | Disler | 43/132.1 |
| 7,565,881 | B2 | * | 7/2009 | Smothers | 119/72 |

* cited by examiner

*Primary Examiner* — Monica Williams
(74) *Attorney, Agent, or Firm* — Jacobson Holman PLLC

(57) ABSTRACT

A liquid nectar hummingbird feeder has a reusable base with a feeding basin that receives a disposable cartridge containing a pre-filled volume of liquid nectar. The cartridge has a single bottleneck opening at a lower end which is initially sealed by a breakable seal in the form of a film layer of foil, coated paper stock, plastic or the like. The base includes a cartridge mounting and opening structure adapted to secure and open the cartridge bottleneck opening by rupturing the film layer seal to allow liquid nectar to flow from the cartridge into the feeding basin.

20 Claims, 7 Drawing Sheets

1

HUMMINGBIRD FEEDER WITH DISPOSABLE RESERVOIR AND REUSABLE BASE

BACKGROUND OF THE INVENTION

1. Field of the Invention

The present invention is related to the field of liquid bird feeders and, more particularly, to a hummingbird feeder having a reusable base configured to receive and open disposable nectar containers.

2. Description of the Related Art

Liquid nectar bird feeders are used for specifically attracting hummingbirds in the same manner as seed feeders are used to attract other birds. Some may consider liquid nectar feeders to be less convenient, however, because of the liquid auto-feed structure. Filling liquid feeders commonly requires inversion of the feeder and certain liquid spillage from this action.

It is therefore desirable to have a liquid nectar hummingbird feeder which minimizes liquid spillage during filling and which even avoids the need for inversion during filling.

SUMMARY OF THE INVENTION

In view of the foregoing, the present invention is directed to a liquid nectar hummingbird feeder having a reusable base that receives a sealed disposable cartridge containing a prefilled volume of liquid nectar. The base includes a liquid feeding basin with feeder ports through which the hummingbirds can access liquid nectar in the basin, and a cartridge mounting and opening structure adapted to secure and open the cartridge for feeder use.

Prior to use, the base is separate from the disposable cartridge and includes a cylindrical collar that is open at the top and preferably located centrally in the base. An upstanding spike or sharp prong is mounted on the bottom of the basin within the collar and extends upwardly to end in a pointed tip.

The cartridge has an end formed in the shape of a bottleneck to provide the cartridge with a single opening that faces downwardly when the cartridge is mounted to the base. The bottleneck opening is sealed by a breakable seal, preferably in the form of a film layer of foil, plastic or other suitable material that can close off and seal the opening until ready for use. A cap can cooperate with and cover the bottleneck in order to protect the breakable seal prior to use.

To mount the cartridge, the bottleneck is fitted (after the cap is removed, if present) into the collar where the film layer is broken by the spike or prong to allow the liquid nectar in the cartridge to flow into the feeding basin. Once the nectar in the cartridge is used up and the cartridge is empty, the cartridge can be easily removed and replaced with a new cartridge.

Accordingly, it is an object of the present invention to provide a reliable, consumer-friendly hummingbird feeder having a reusable base and a disposable liquid-holding cartridge that is easy to use and which effectively eliminates the problem of liquid spillage when preparing the feeder for use.

Another object of the present invention is to provide a hummingbird feeder in accordance with the preceding object in which the liquid-holding cartridge is sealed prior to use and after use is simply disposed of with a new cartridge being mounted in its place.

A further object of the present invention is to provide a hummingbird feeder in accordance with the preceding objects in which the base includes a cartridge mounting and opening structure that opens the breakable seal on the cartridge upon mounting of the cartridge to the base.

Still another object of the present invention is to provide a hummingbird feeder in accordance with the preceding objects in which a plurality of bases and cartridges of different styles and shapes can be used interchangeably to alter the appearance of the feeder as desired.

An additional object of the present invention is to provide a hummingbird feeder in accordance with the preceding objects which has components that can be easily manufactured from readily available and known materials and that can be easily assembled and disassembled for refilling and which will be sturdy and long lasting in operation.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
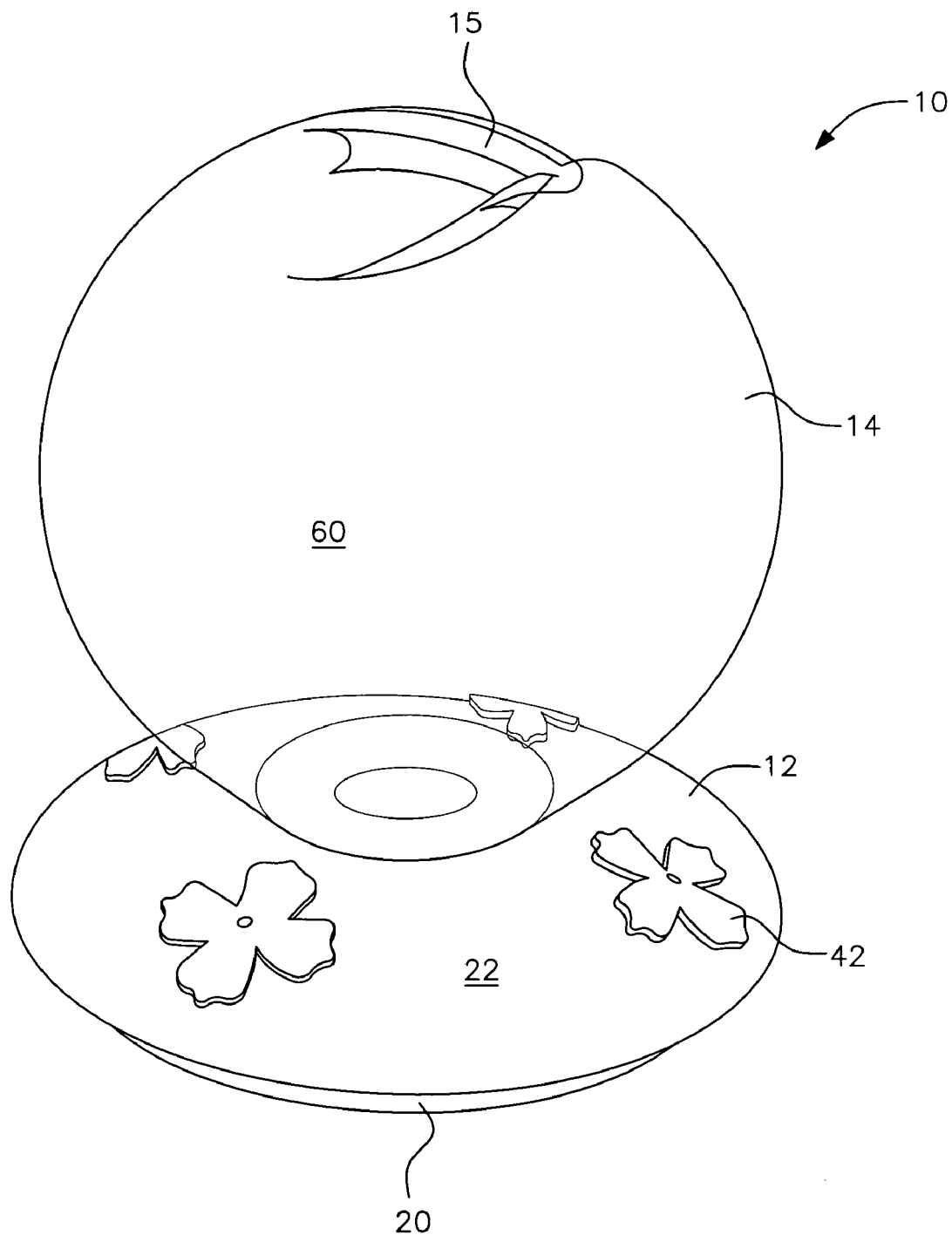
FIG. 1 is a perspective view of a bird feeder having a base and a cartridge constructed in accordance with a first embodiment of the present invention.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose. Furthermore, as multiple embodiments are disclosed in which many of the components are shared, components that are comparable from one embodiment to another but not exactly the same are designated by the reference numerals used in the first embodiment but with an appropriate prefix numeral of "2", "3", "4", etc. indicating the relevant embodiment.

Figure 2:
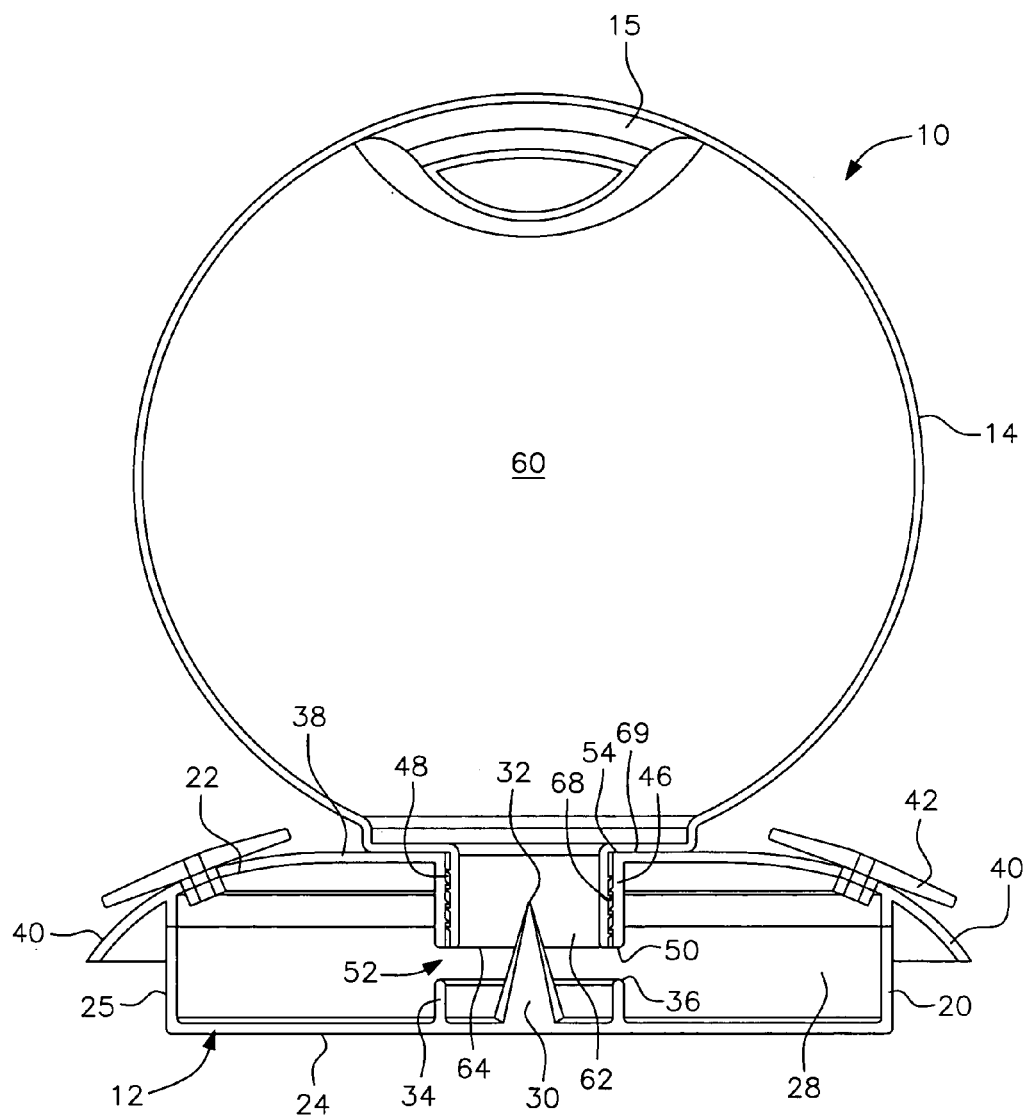
FIG. 2 is a sectional side view of the bird feeder shown in FIG. 1.

Turning to the drawings, FIGS. 1 and 2 show a perspective and partial sectional side view, respectively, of a hummingbird feeder generally designated by reference numeral 10, in accordance with a first embodiment of the present invention. The feeder includes a reusable base generally designated by reference numeral 12 and a disposable liquid container or cartridge 14. The same base 12 can be used with multiple cartridges, including cartridges of different designs such as the cartridge 114 shown in FIGS. 3 and 4, as well as the cartridge 14 shown in FIGS. 1 and 2. Other cartridge configurations will readily occur to those skilled in the art.

The base 12 includes a basin 20 and a cover 22 that are coupled to one another, preferably by threaded engagement so that they twist together for use and apart for cleaning. Alternatively, the basin 20 and cover 22 could have a snap or friction fit, or any other known connection configuration. The basin 20 and cover 22 could also have a one-piece construction although this is not preferred as cleaning would be made more difficult.

The basin 20 preferably has a generally flat bottom surface 24 and one or more upwardly extending side walls 25, with the number of walls depending upon the shape of the basin. In the embodiment shown in FIGS. 1, 2 and 2A, the basin bottom surface 24 is generally circular so that a single continuous sidewall 25 comes upwardly therefrom to define a nectar holding area 28.

Figure 2A:
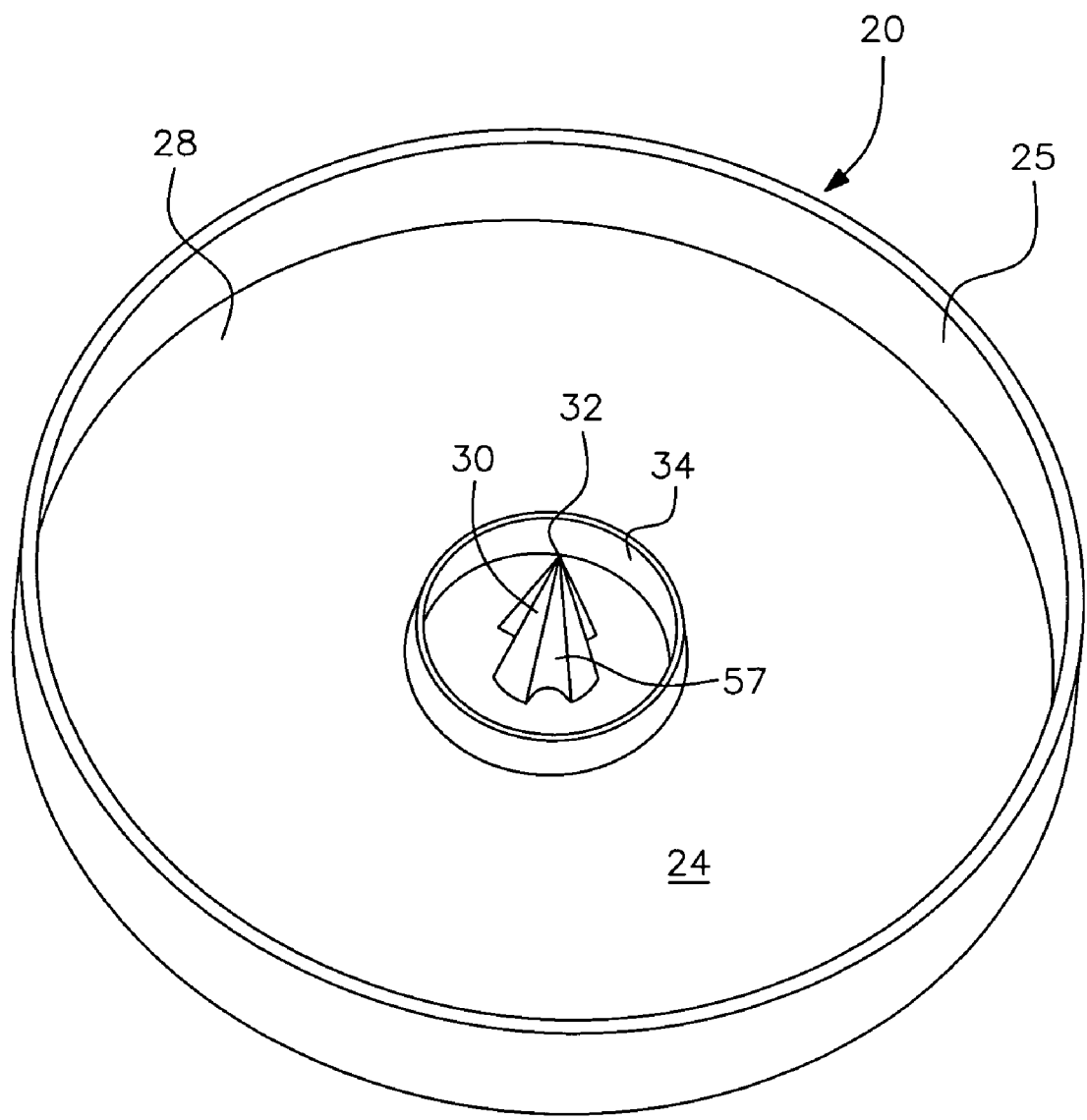
FIG. 2A is a top perspective view of the base of the feeder shown in FIG. 1.

Generally centered on and projecting upwardly from the bottom surface 24 is a spike or prong 30 having a pointed tip 32. The base of the prong is surrounded by an upwardly extending collar 34 while the tip 32 projects above the upper edge 36 of the collar 34. The prong 30 preferably has a tapered shape from the base thereof toward the top piercing tip 32 and preferably includes vertical or helical side channels 57, as shown in FIG. 2A, to facilitate nectar flow out of the bottleneck opening 64, to be described hereinafter.

The cover 22 is shaped in a manner complementary to the basin 20 which, in the embodiment shown, is generally circular in plan view. The center area 38 of the top of the cover 22 is generally flat with the side areas 40 sloping downwardly to form a dome-like shape. Feeding ports 42 are formed in the side areas 40 which allow the hummingbirds to access the nectar in the nectar holding area 28 of the basin 20.

Extending downwardly from the center area 38 of the cover 22 toward the basin 20 is a cover collar 46. The inner surface 48 of the cover collar 46 is threaded in the embodiment shown in FIG. 2, although other configurations are also contemplated as will be discussed hereinafter. When the cover 22 is secured to the basin 20, the lower edge 50 of the cover collar 46 is spaced from the upper edge 36 of the basin collar 34 as shown. This spacing provides a collar channel, generally designated by reference numeral 52, for fluid flow from the cartridge 14 into the basin nectar holding area 28. A sealing member such as a gasket 54 is preferably fitted inside the top of the collar 46 to form a seal with the bottom of the bottleneck 62 and facing surface 69 of the cartridge 14 upon mounting of the cartridge 14 to the base 12.

Figure 3:
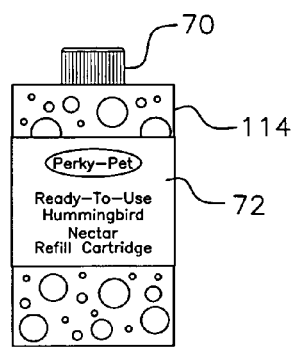
FIG. 3 is a side view of an alternate cartridge for use with the base of the feeder shown in FIG. 2A.
Figure 4:
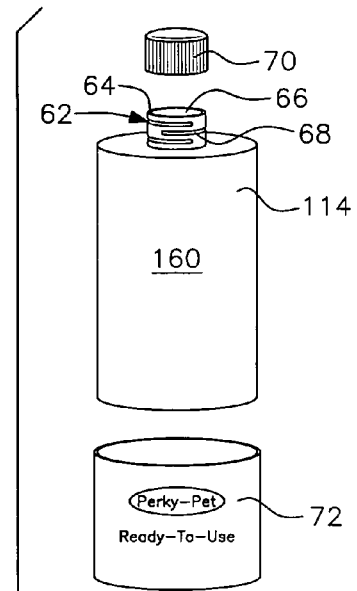
FIG. 4 is an exploded perspective view of the components of the cartridge shown in FIG. 3.

Referring now to FIGS. 1-4, each cartridge 14, 114 includes a body 60, 160 for holding a pre-filled amount of nectar and a bottleneck 62, 162 with an end or bottleneck opening 64 that faces downwardly when the cartridge is mounted to the base 12 and forms a single opening for the cartridge 14, 114. As shown in FIG. 4, prior to use the opening 64 is sealed by a breakable seal, preferably in the form of a film layer 66 of coated paper stock, foil, plastic or other suitable material that closes off and seals the opening 64 prior to use. The outer surface of the bottleneck 62, 162 is provided with external threads 68 and the opening 64 with the sealed film layer 66 is preferably covered by a bottle cap 70 having internal threads by which the cap 70 is screwed onto the bottleneck, as is conventionally known. As shown in FIG. 3, the cartridge 14, 114 may be effectively packaged with this double-sealed configuration along with an easily removed label 72 made of cardboard or other material known for the purpose of displaying product information.

To mount the cartridge 14, 114 to the base 12, the label 72 and bottle top 70 are removed and the bottleneck 62, 162 of the cartridge 14, 114 is inserted into the cover collar 46. The bottleneck is screwed into the cover collar 46 by rotating the body 60, 160 clockwise in a conventional manner. When the bottleneck is sufficiently inserted into the collar 46 to bring the film layer 66 into contact with the tip 32 of the prong 30, the film layer is pierced by the tip 32. Continued rotation causes further penetration of the prong 30 into the opening 64, thus rupturing the film layer and allowing the liquid nectar in the cartridge 14, 114 to flow into the nectar holding area 28 through the collar channel 52. Once the nectar level has reached the lower edge 50 of the cover collar 46 (see FIG. 2), or the outer edge of the bottleneck, whichever is lower, further flow of nectar into the basin is prevented by the vacuum created by the closed body 60, 160 of the cartridge. The feeder is then ready for use.

When the cartridge 14, 114 empties during use, it can be easily removed by unscrewing the bottleneck 62, 162 from the cover collar 46, through rotating of the body counterclockwise, and then thrown away. A new cartridge 14, 114, of the same or a different design, is then mounted to the base in the same manner as the original cartridge. The disposable cartridge eliminates the potential mess associated with refilling as no mixing or pouring are required.

Figure 5:
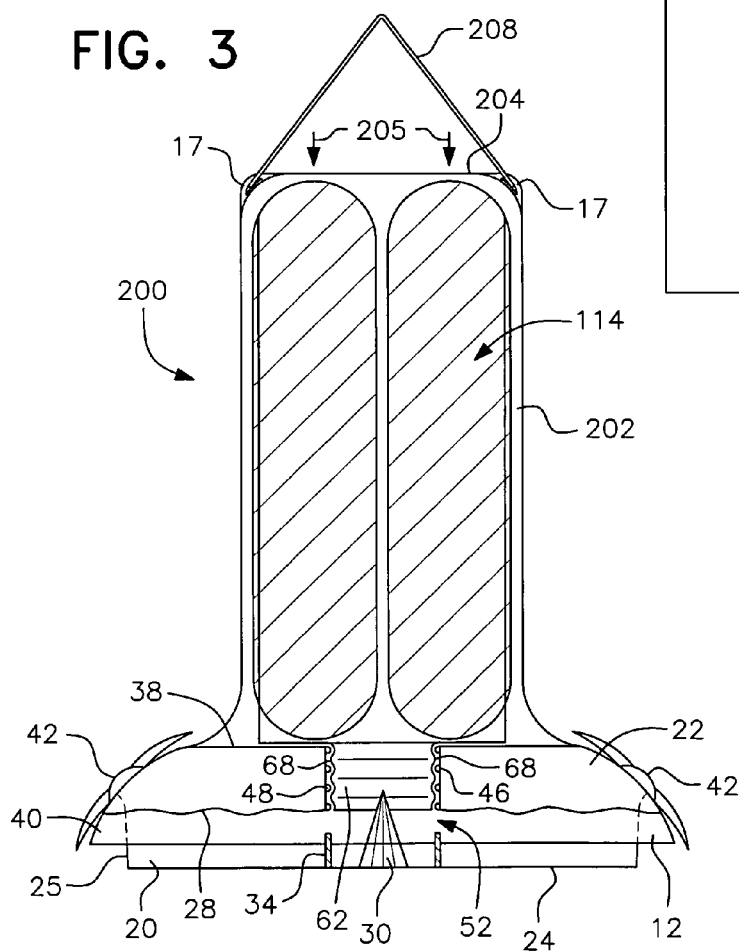
FIG. 5 is a partial sectional side view of a bird feeder constructed in accordance with a second embodiment of the present invention.

The base and cartridge may have many different shapes, styles and colors without departing from the scope of the present invention. As an example, a second embodiment of a hummingbird feeder in accordance with the present invention is shown in FIG. 5 and generally designated by reference numeral 200. The base 12 is substantially the same as that shown in the embodiment of FIGS. 1, 2 and 2A, and the cartridge 114 functions in the same way as already discussed. The feeder 200, however, includes a cartridge frame 202 that is rigidly mounted on or affixed to the base 12. The frame 202 provides support to the cartridge 114 and is also decorative in appearance. The top 204 of the frame 202 is open, or can be opened, so that cartridges 114 can slide into the frame from the top 204, as indicated by the arrows 205 in FIG. 5. The hanging wire 208 can be moved out of the way when inserting the cartridge 114. And, the sealed cartridge bottleneck opening 64 is opened by prong 30 with vertical or helical side channels 57 in the same manner as in the previous embodiment.

With the cartridge frame style of feeder of FIG. 5, appropriately shaped cartridges must be used, i.e., the user is not free to interchange with alternate cartridge styles to the same degree that is possible with the first embodiment. However, multiple interchangeable frames are contemplated that would allow the user to change the look of the feeder by replacement of the frame with a different frame design.

Figure 6:
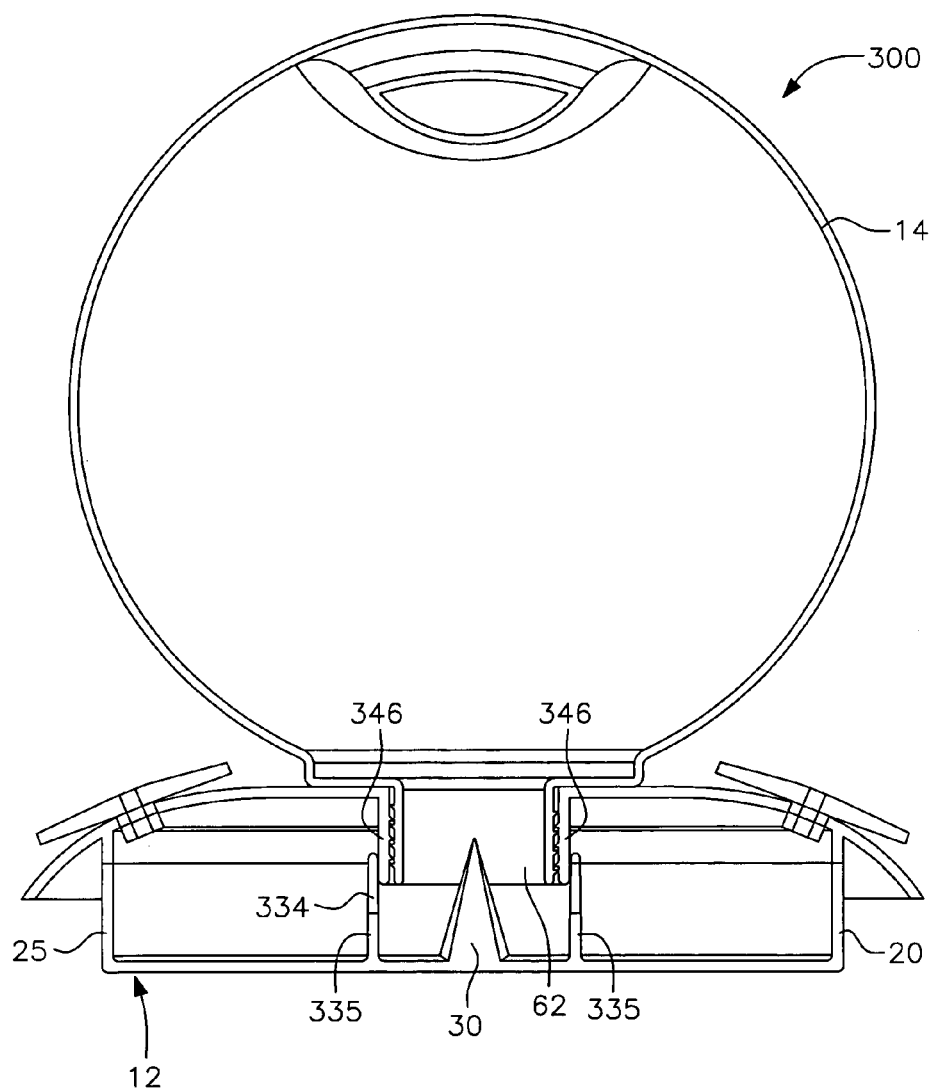
FIG. 6 is a sectional side view of a bird feeder constructed in accordance with a third embodiment of the present invention.

A sectional side view of a third embodiment of a hummingbird feeder in accordance with the present invention is shown in FIG. 6 and generally designated by reference numeral 300. As shown, the basin collar 334 extends all the way up to engage the cover collar 346 with a friction fit. To allow nectar to flow once the cartridge bottleneck 62 is screwed into the cover collar 346, the basin collar 334 is provided with side slots 335 through which the nectar in the cartridge 14 can enter the basin nectar holding area 28.

Figure 7:
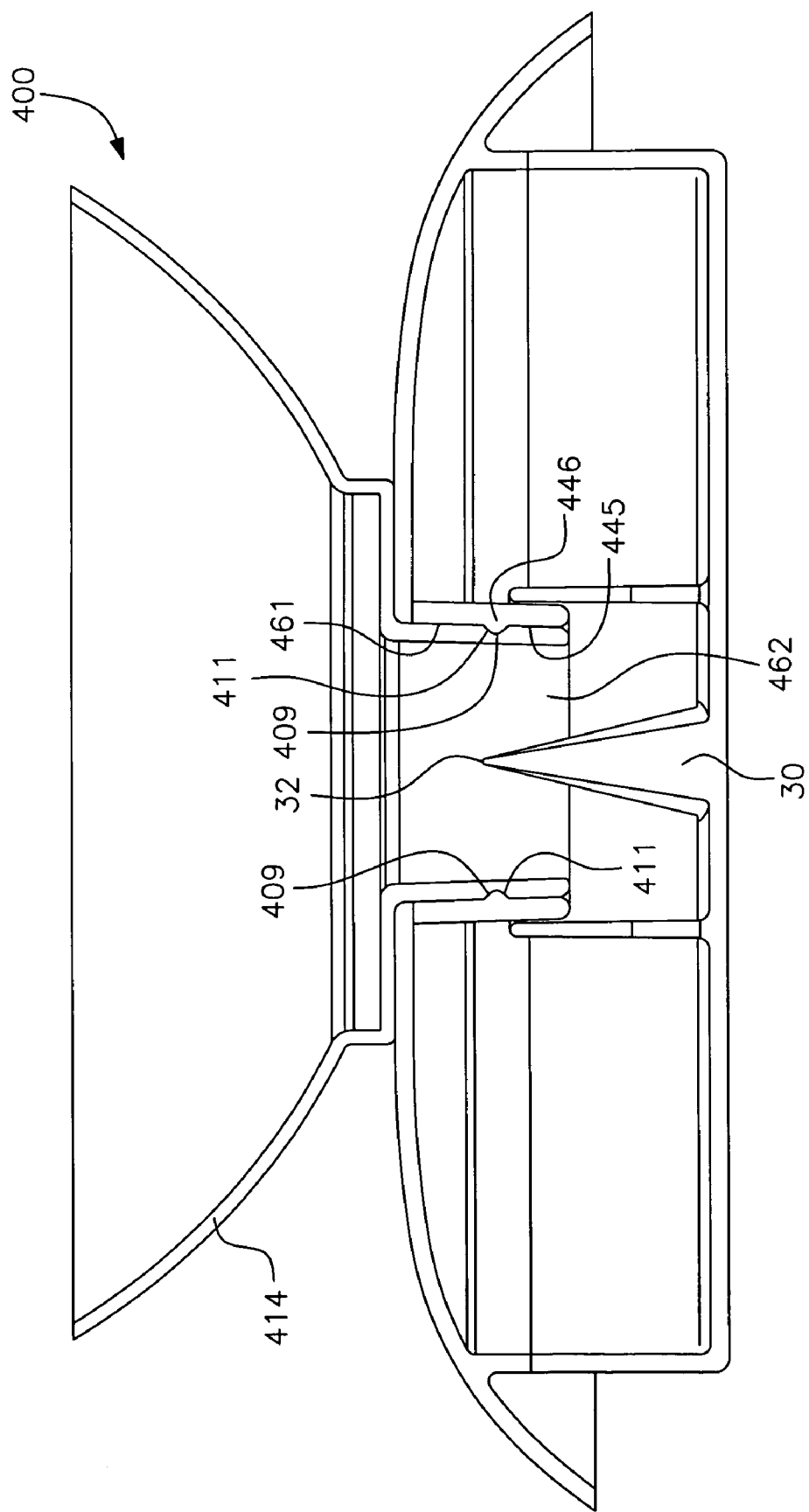
FIG. 7 is an enlarged, partial sectional, side view of a bird feeder constructed in accordance with a fourth embodiment of the present invention.

A fourth embodiment of a hummingbird feeder in accordance with the present invention is shown in FIG. 7 and generally designated by reference numeral 400. Unlike the previous embodiments, the embodiment shown in FIG. 7 does not rely on threaded engagement between the cartridge 414 and the cover collar 446. Instead, the outer surface 461 of the bottleneck 462 of the cartridge 414 and the inner surface 445 of the cover collar 446 have generally smooth engaging surfaces and are joined by a press fit or a snap fit. In FIG. 7, a snap fit is depicted in which groove 409 formed in the outer surface 461 of the bottleneck 462 is engaged with a raised circumferential rib on the inner surface 445 of the cover collar when the cartridge is fully inserted into the cover collar 446. A press fit would be similarly realized by frictional engagement between the bottleneck and the cover collar, but without the mating groove and rib. In either case, the pressing or snapping engagement of the bottleneck with the cover collar forces the film layer downwardly onto the sharp tip 32 so that the prong 30 pierces and ruptures the seal and allows nectar to fill the basin. In this embodiment, the mating outer surface 461 of the bottleneck 462 and inner surface 445 of the cover collar 446 need not be cylindrical, and any configuration may be possible, such as triangular, square, pentagonal, etc.

Figure 8:
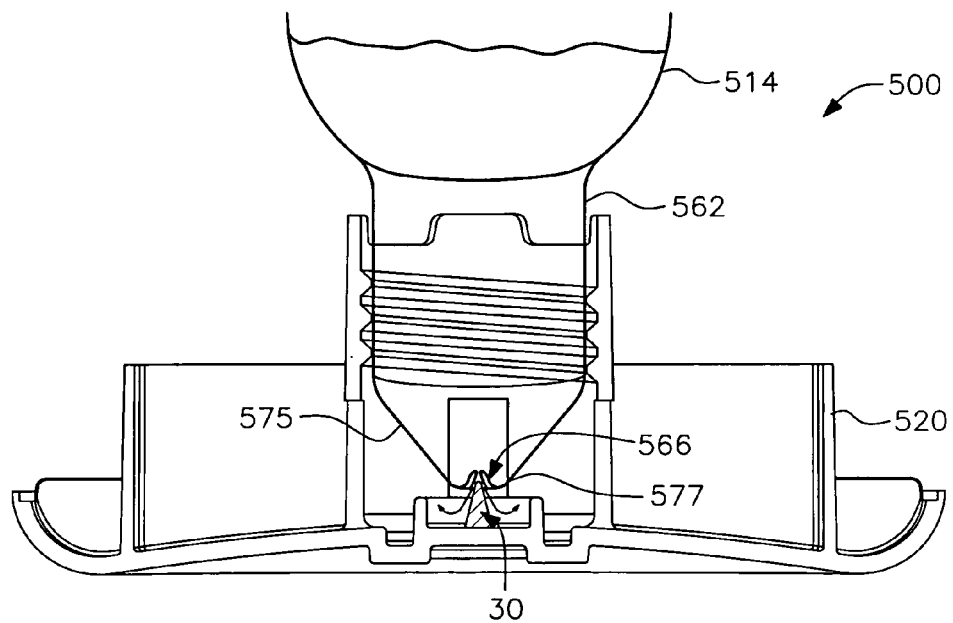
FIG. 8 is an enlarged, partial sectional, side view of a bird feeder constructed in accordance with a fifth embodiment of the present invention.
Figure 9:
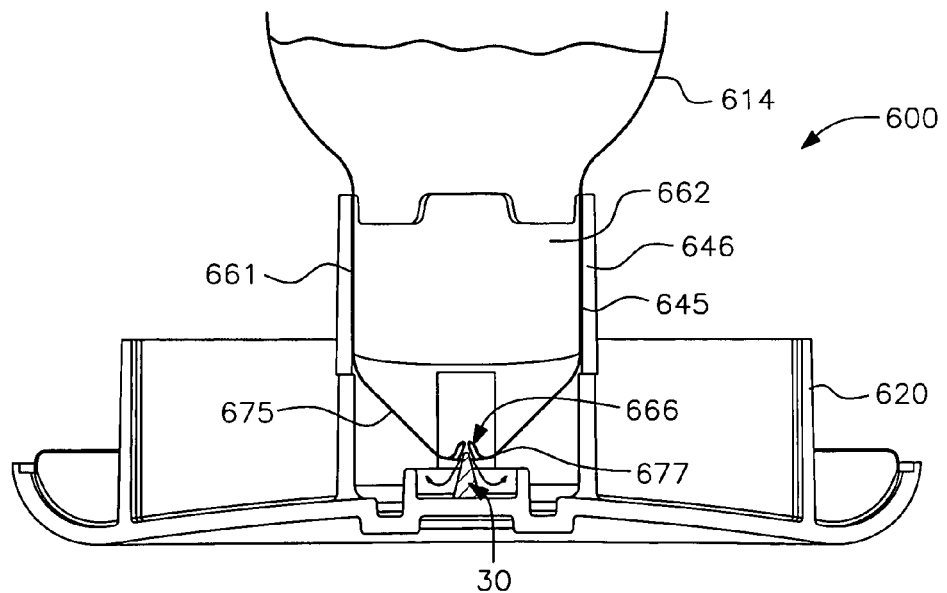
FIG. 9 is an enlarged, partial sectional, side view of a bird feeder constructed in accordance with a sixth embodiment of the present invention.

A fifth embodiment of a hummingbird feeder in accordance with the present invention is shown in FIG. 8 and generally designated by reference numeral 500. As shown, the cartridge 514 of hummingbird feeder 500 has a bottleneck 562 with a generally conical or domed end 575. Only the tip 577 of the domed end 575 is covered with a breakable seal 566 such as a foil or plastic film layer, just as in the previous embodiments. The domed end 575 serves to reduce the size of the opening covered by the film layer, providing greater control over the total size of the opening that is created when the film layer is broken Similar to FIG. 8, the embodiment shown in FIG. 9 and generally designated by reference numeral 600 also has a cartridge 614 with a bottleneck 662 having a generally conical or domed end 675 to reduce the size of the opening covered by the breakable seal or film layer 666 on the tip 677. Like the fourth embodiment, the embodiment shown in FIG. 9 does not rely on threaded engagement between the cartridge and the cover collar. Instead, the outer surface 661 of the bottleneck 662 of the cartridge 614 and the inner surface 645 of the cover collar 646 have generally smooth engaging surfaces and are joined by a press fit or a snap fit.

As has already been noted, the hummingbird feeder in accordance with the present invention can be designed with a wide variety of base and cartridge designs, including different shapes, colors, textures, etc. According to one preferred embodiment, the cartridges are made of plastic in the manner of consumer drink bottles and, also like such bottles, could be made of glass. The bases may be made of plastic for less expensive models or ornamental metal or other material for enhanced appearance and durability.

The disposable cartridges may be packaged singly or in multi-packs and, except in the case of bases having cartridge frames, may be used interchangeably with different base designs to give the consumer a wide variety of feeder appearance options that can be changed as often as the cartridges.

The cartridges may be made to include a support structure such as center loop 15 or edge loops 17 as shown in FIGS. 1 and 4, respectively, by which the feeder can be suspended from a support structure such as a pole or a tree limb.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A liquid hummingbird feeder, comprising:
a hummingbird nectar cartridge removably coupled to a reusable base, said hummingbird nectar cartridge containing an amount of hummingbird liquid nectar sealed therein by a breakable seal that covers an opening in a lower end of said cartridge; and
said reusable base having a cover and a feeding basin for containing hummingbird liquid nectar, said cover including at least one feeding port formed as an opening in an upper surface of said cover, said opening being readily accessible to and sized for a hummingbird's beak to allow a hummingbird to access liquid nectar through said cover upper surface when said feeder is in use;
said base further including a cartridge mounting and opening structure adapted to secure and open the cartridge by breaking the breakable seal to allow liquid nectar to flow into the feeding basin.

2. The liquid hummingfeeder of claim 1, wherein said cover fits onto said feeding basin to form a seal therewith, said cover having a collar that extends downwardly in a generally vertical direction, said cartridge being received within said collar in a generally vertical orientation.

3. The liquid hummingfeeder of claim 2, wherein a prong projects upwardly from said feeding basin in generally axial alignment with said collar, said prong piercing said breakable seal when said cartridge is mounted in said cover collar.

4. The liquid hummingfeeder of claim 3, wherein said breakable seal is a film layer of foil, coated paper stock or plastic.

5. The liquid hummingfeeder of claim 2, wherein said cartridge has a bottleneck with external threads and said collar has internal threads to engage said bottleneck and secure said cartridge to said base.

6. The liquid hummingfeeder of claim 2, wherein said cartridge has a bottleneck that engages said collar with a snap or press fit.

7. A liquid hummingbird feeder, comprising:
a disposable hummingbird nectar cartridge removably coupled to a reusable base positioned below said cartridge in a mounted state;
said disposable cartridge having a single opening in the form of a bottleneck at a lower end of the cartridge in a mounted state, said cartridge containing an amount of hummingbird liquid nectar sealed therein by a breakable seal that covers said bottleneck opening;
said reusable base having a feeding basin for distributing said hummingbird liquid nectar from said cartridge to hummingbirds, said base including a collar that extends in a generally vertical direction and has an interior surface which mates with an exterior surface of said cartridge bottleneck to secure said cartridge to said base, said base further including a prong projecting upwardly in said feeding basin in generally axial alignment with said collar, said prong configured to pierce said breakable seal when said cartridge bottleneck is mounted in said collar; and
a cover having an upper surface and a lower edge that is sealingly coupled to an upper part of said feeding basin, said cover including at least one hummingbird nectar access opening in said upper surface, said nectar access opening being readily accessible to and sized for a hummingbird's beak to allow a hummingbird to access liquid nectar through said nectar access opening when said feeder is assembled with said cartridge secured to said base for use.

8. The liquid hummingfeeder of claim 7, wherein said breakable seal is a film layer of foil, coated paper stock, or plastic.

9. A liquid hummingbird feeder base for use with disposable pre-filled hummingbird liquid nectar cartridges, comprising:
a feeding basin for distributing hummingbird liquid nectar to hummingbirds, said basin having a bottom surface and upwardly directed sides to form an open top, said bottom surface including a prong with a pointed tip projecting upwardly from said bottom surface; and
a cover having an upper surface and downwardly directed sides coupled to said upwardly directed sides of said feeding basin to form a liquid tight seal therewith, said cover having a central opening configured to receive a pre-filled liquid nectar cartridge;
at least one hummingbird feeding port formed in said cover upper surface, said feeding port being readily accessible to and sized for a hummingbird's beak, said feeding port being smaller than and spaced from said cover central opening, said feeding port allowing hummingbirds to access hummingbird liquid nectar contained in said feeding basin after said cover is sealed to said basin;
said feeding basin including a collar that extends in a generally vertical direction and surrounds said prong in generally axial alignment therewith, said collar configured to receive a mounting portion of a pre-filled hummingbird nectar cartridge and to bring said cartridge into contact with said prong to open the cartridge and allow liquid nectar to flow into the feeding basin.

10. The liquid hummingbird feeder base as set forth in claim 9, wherein said collar has internal threads to engage the mounting portion of a pre-filled nectar cartridge.

11. The liquid hummingbird feeder base as set forth in claim 9, wherein said collar has a smooth internal surface to engage the mounting portion of a pre-filled nectar cartridge with a snap or press fit.

12. The liquid hummingbird feeder base as set forth in claim 9, wherein said prong includes vertical or helical grooves on a side surface thereof to facilitate nectar flow once the cartridge has been opened.

13. A method of filling a liquid hummingbird feeder base having a basin for containing liquid nectar for hummingbirds and a cartridge mounting and opening structure, comprising the steps of:
providing a hummingbird feeder base with a basin for holding hummingbird nectar, said basin having a cartridge opening structure;
securing a cover to an upper part of said feeding basin, said cover having a central opening in an upper surface and having a cartridge mounting structure associated with said central opening and downwardly directed toward said feeding basin, said cover further including at least one hummingbird nectar-access opening in said upper surface of said cover and spaced from said central opening, said at least one hummingbird nectar-access opening being readily accessible to and sized for a hummingbird's beak to allow a hummingbird to access liquid nectar through said at least one hummingbird nectar-access opening;
providing a pre-filled hummingbird liquid nectar cartridge that has a bottleneck with an opening sealed by a film layer;
inserting the bottleneck of the cartridge through the cover central opening to secure said bottleneck to the cartridge mounting structure while said hummingbird nectar-access opening in the upper surface of the cover remains open, said step of inserting including bringing said bottleneck film layer into contact with said opening structure of the basin feeder base until said film layer is broken thereby and liquid nectar from said cartridge flows into said basin.

14. The method as set forth in claim 13, wherein said cartridge mounting structure includes an internally threaded collar and said bottleneck has external threads, said step of inserting including screwing said bottleneck into said internally threaded collar.

15. The method as set forth in claim 14, wherein said cartridge opening structure includes an upwardly projecting prong with a pointed tip, said step of inserting including screwing said bottleneck into said collar until said prong pierces said film layer.

16. The method as set forth in claim 13, wherein said cartridge mounting structure includes a collar, said step of inserting including pushing said bottleneck into said collar for engagement therein by a press or snap fit.

17. The method as set forth in claim 13, wherein said cartridge mounting structure includes a collar and said cartridge opening structure includes an upwardly projecting prong with a pointed tip, said step of inserting including pushing said bottleneck into said collar until said prong pierces said film layer.

18. In combination, a hummingbird feeder base and a disposable hummingbird liquid nectar cartridge, said combination comprising:
a reusable liquid hummingbird feeder base having a cover and a feeding basin for containing hummingbird liquid nectar, said cover including at least one feeding port formed as an opening in an upper surface of said cover, said opening being readily accessible to an sized for a hummingbird's beak to allow a hummingbird to access liquid nectar through said cover upper surface when said feeder is in use; and
a hummingbird liquid nectar cartridge pre-filled with a quantity of hummingbird liquid nectar, said cartridge having a bottleneck at a lower end of the cartridge as mounted on said liquid hummingbird feeder base for use, said bottleneck having a single opening that is sealed prior to use by a breakable seal that covers said bottleneck opening and seals the quantity of nectar in said pre-filled cartridge, an external surface of said bottleneck having threads for removable threaded coupling of the hummingbird liquid nectar cartridge to said liquid hummingbird feeder base to assemble a liquid hummingbird feeder, said base including an opening structure that breaks said seal upon coupling of said liquid nectar cartridge to said liquid hummingbird feeder base.

19. The combination as set forth in claim 18, said disposable hummingbird liquid nectar cartridge further comprising a removable cap having internal threads complementary with the external threads on said bottleneck, said cap being threadedly engaged with said bottleneck to cover and protect the seal from being broken prior to assembly of the hummingbird liquid nectar cartridge with a liquid hummingbird feeder base.

20. The combination as set forth in claim 18, further comprising a cartridge frame into which said liquid nectar cartridge is inserted during assembly of the hummingbird liquid nectar cartridge with said liquid hummingbird feeder base.

* * * * *